Figure 3:
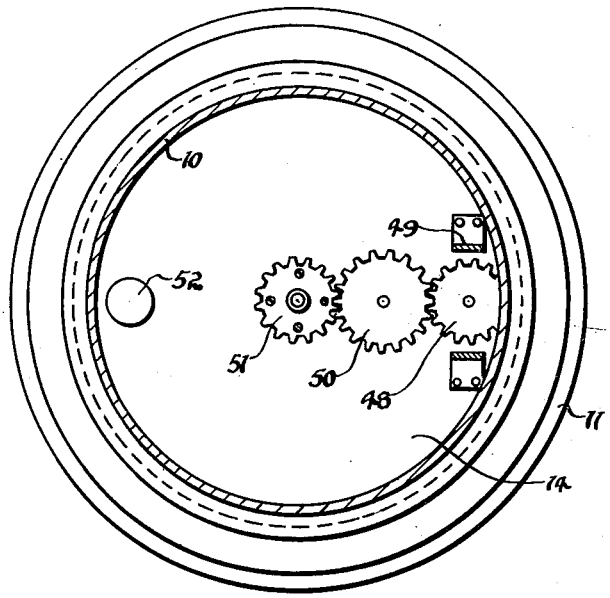

March 11, 1952     W. J. TWAMLEY     2,588,433
AIRCRAFT ORIENTATION DEVICE
Filed April 12, 1949     3 Sheets-Sheet 1
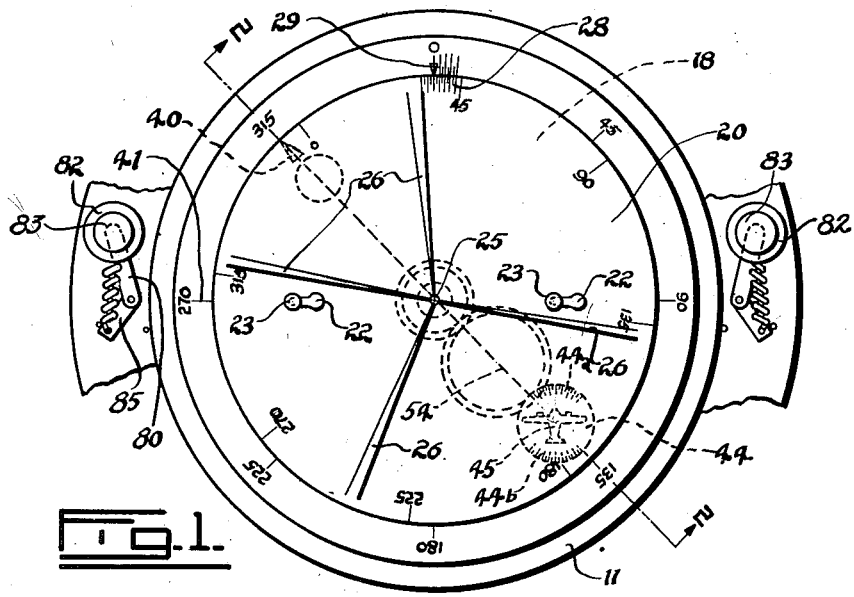
Fig.1.
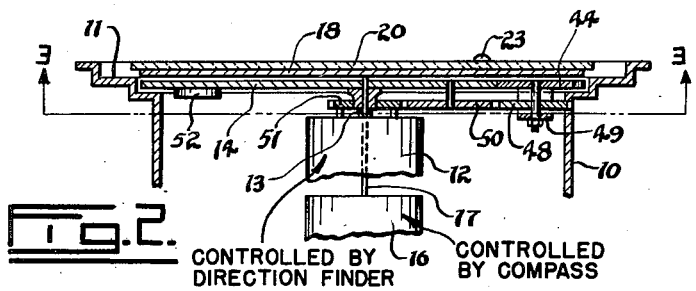
Fig.2.     Fig.5.
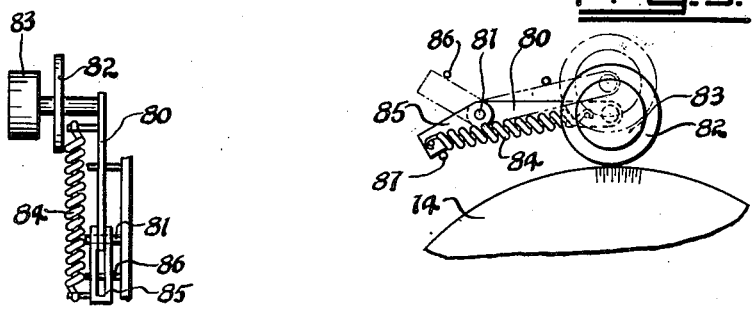
Fig.6.
INVENTOR
WALTER JOHN TWAMLEY
BY
ATTORNEYS March 11, 1952 W. J. TWAMLEY 2,588,433
AIRCRAFT ORIENTATION DEVICE
Filed April 12, 1949 3 Sheets-Sheet 2

INVENTOR
WALTER JOHN TWAMLEY
BY
Fetherstonhaugh & Co.
ATTORNEYS

March 11, 1952 — W. J. TWAMLEY — 2,588,433
AIRCRAFT ORIENTATION DEVICE
Filed April 12, 1949 — 3 Sheets-Sheet 3
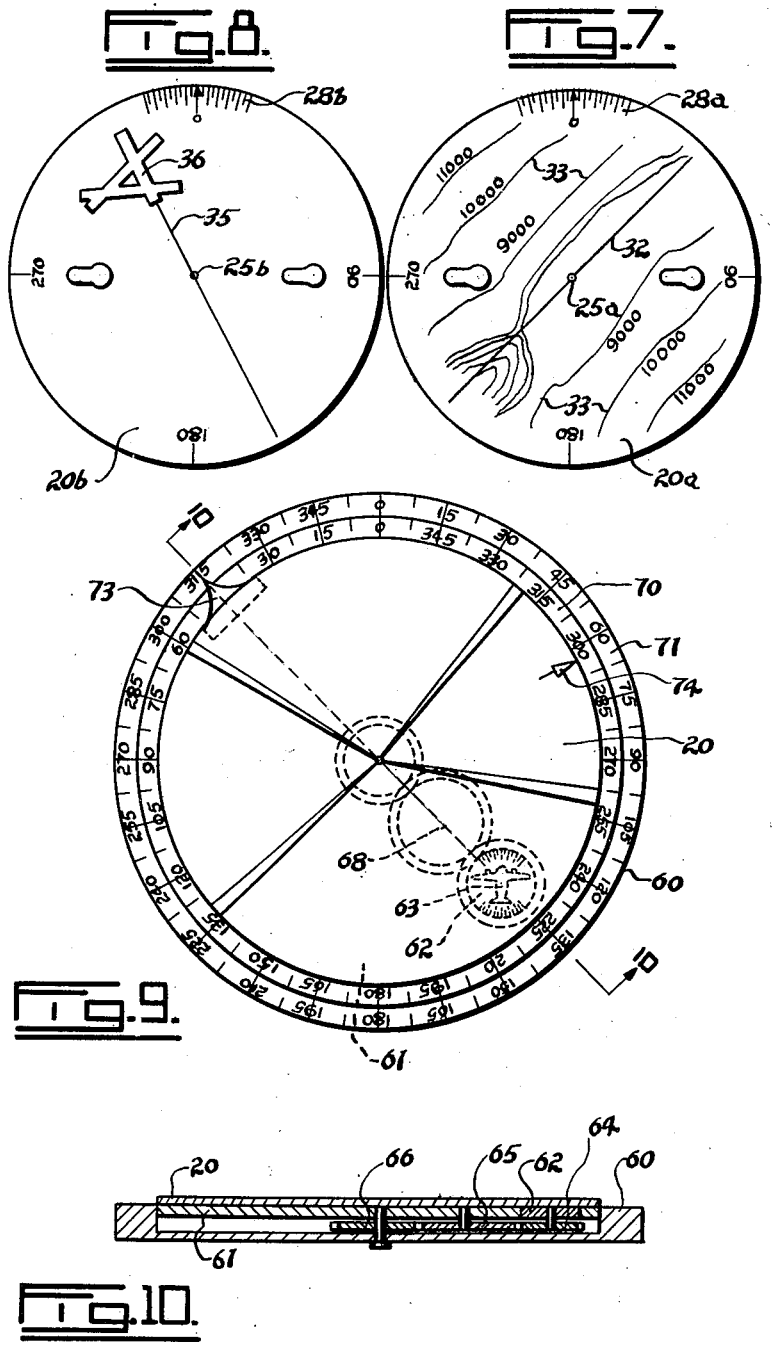
INVENTOR
WALTER JOHN TWAMLEY
BY
Fetherstonhaugh & Co.
ATTORNEYS Patented Mar. 11, 1952

2,588,433

UNITED STATES PATENT OFFICE 2,588,433

AIRCRAFT ORIENTATION DEVICE

Walter John Twamley, Vancouver, British Columbia, Canada

Application April 12, 1949, Serial No. 86,975

13 Claims. (Cl. 177—352)

This invention relates to a device by means of which the orientation of an aircraft, with reference to any radio station, or radio range station, may be visually represented to the pilot without the necessity for numerous calculations, most of which have to be done mentally.

When flying on a radio "range," a pilot must, of necessity, listen continuously to the signals from the range station, a factor which is acknowledged to contribute greatly to pilot fatigue. Prior to getting on a "leg" of a range from a lost position, he must use up considerable time and fuel flying various courses in order to eliminate all possible wrong positions before he is satisfied as to his actual orientation. If the pilot has at his disposal a radio compass, he can save a large portion of this time and fuel but he is still faced with the necessity of making continuous mental calculations in order to orient himself and to maintain his track towards or away from the radio station and make proper allowance for wind drift. These calculations, especially when flying under hazardous conditions or in emergencies, or if the pilot is fatigued, may quite easily be wrong and may, as has often happened, lead to diaster.

More especially are these calculations difficult and subject to error when a pilot is manoeuvering over an airport in an overcast, as he is then fully occupied with many duties such as lowering and checking landing gear, changing propellor and throttle adjustments, keeping in radio communication with the control tower, checking his fuel and, of vital importance, keeping in mind the locations of other aircraft in the vicinity which he cannot see and whose positions are rapidly changing. Also, after a pilot has arrived over an airport, a further problem often arises that he cannot land on the runway in line with his approach from the range station due to cross winds and he has to chose a more favourable runway. Turning around the airport to line up with the favourable runway in conditions of low visibility presents a different problem with every different wind direction and velocity and is very difficult.

An object of the present invention is to provide the pilot of an aircraft with the picture of the angular relationship between a radio station and the aircraft at all times, and to indicate to him the "line of position" between his aircraft and the station.

Another object is the provision of a device which will continuously indicate to the pilot the amount of drift in degrees while maintaining a track towards or away from a radio station.

A further object is the provision of a device including an aircraft direction indicator which may be in the form of a miniature aircraft which will act similarly to the aircraft and thereby give the pilot a clear indication of his bearing relative to a radio station and the angle between the longitudinal axis of his aircraft and this bearing so that if he keeps the indicator or miniature aircraft on a proper course he knows that his aircraft is flying in the required direction.

Other objects are the provision of an aircraft orientation device which eliminates the necessity for continuous listening to range signals, excepting for checking at intervals; which enables a pilot to fly his aircraft along an approach line to a runway in an overcast prior to landing; which permits rapid checking of the "legs" or courses of a range station; and which helps greatly to reduce "pilot fatigue."

Figure 4:
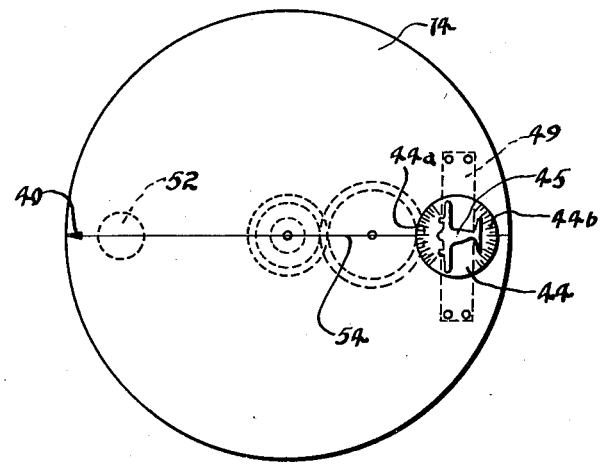

With the above and other objects in view, the present invention consists essentially of an orientation device for aircraft and the like comprising a chart disc rotatably mounted at its centre which represents the position of a radio station, said chart disc being adapted to indicate the heading of the aircraft, a direction disc rotatably mounted at its centre beneath the chart disc, said direction disc being adapted to indicate the relative bearing between the aircraft and the station, an aircraft direction indicator rotatably mounted on the direction disc, and means for keeping the direction indicator pointed in the direction of the aircraft longitudinal axis regardless of the setting of the direction disc, thus indicating the "drift" angle as more fully described and illustrated by way of example in the following specification and the accompanying drawings, in which, Figure 1 is a plan view of one form of orientation device, Figure 2 is a section taken on the line 2—2 of Figure 1, Figure 3 is a section taken on the line 3—3 of Figure 2, Figure 4 is a plan view of the direction disc, Figure 5 is an enlarged plan view of a manual operator which may be used with this device, Figure 6 is a large side elevation of the manual operator, Figures 7 and 8 illustrate two examples of charts which may be used with this device, Figure 9 is a plan view of a hand operated orientation device, and Figure 10 is a section taken on the line 10—10 of Figure 9.

Referring to Figures 1 to 4, 10 is a casing in which the aircraft orientation device is mounted, said casing having a flange 11 around the top thereof. An autosyn receiver 12 of an aircraft direction finder (not shown) is mounted in the casing and has a hollow shaft 13 projecting outwardly therefrom upon the outer end of which a direction disc 14 is mounted. The shaft 13 is actually located at the centre of the disc. A compass-controlled autosyn receiver 16 is mounted in the casing beneath the receiver 12, and has a shaft 17 projecting outwardly therefrom which extends through the receiver 12, shaft 13, and disc 14. A chart disc 18 is mounted at its centre point on the outer end of the shaft 17 immediately above the disc 14. The chart disc is preferably formed of transparent material, and it may have a chart inscribed on it, but it is preferable to have the charts on a transparent chart disc 20 which is removably mounted on the disc 18 in any convenient manner. One way of accomplishing this, is to form keyhole slots 22 in the disc 18 which are adapted to fit over headed pins 23 projecting upwardly from the chart disc.

The centre point 25 of the disc 20 illustrated in Figure 1 represents a radio range station, and the range legs radiating from this station are indicated at 26. This disc also has an azimuth scale 28 at its periphery which reads against a lubber line 29 on the flange 11. This scale runs clockwise on the disc.

Figures 7 and 8 illustrate two examples of alternative discs which may be used in place of the disc 20 shown in Figure 1. In Figure 7, the disc 20a has a radio station 25a indicated at the centre thereof through which a line 32 extends, said line indicating an approach to a landing field. Contour lines 33 indicate the elevations of the land along this course. The disc 20a has an azimuth scale 28a at its periphery. The disc 20b of Figure 8 has a central station 25b through which a course line 35 extends to a certain landing strip indicated at 36. This disc also has an azimuth scale 28b at its periphery.

The direction disc 14 has a relative bearing indicator 40 at its periphery which reads on an azimuth scale 41 on the flange 11. This scale extends clockwise around the flange.

A rotor 44 is rotatably mounted in the disc 14. This rotor has an aircraft direction indicator on the surface thereof which, as shown in this example, is preferably in the form of a miniature aircraft 45. As is well known, the lubber line 29 is on a line coinciding with or parallel with the longitudinal axis of the aircraft. The direction indicating miniature aircraft is always maintained pointing in the direction of the longitudinal axis of the aircraft in which the device is mounted. Thus, the miniature aircraft is always pointing along a line coinciding with or parallel with a line extending through the lubber line. In other words, the longitudinal axis of the miniature aircraft is always parallel with the longitudinal axis of the aircraft. One way of keeping the aircraft direction indicator 45 pointing in the correct direction regardless of the setting of the direction disc 14 is to provide a gear 48 beneath and secured to the rotor 44. This gear is held in place and is secured to the underside of the direction disc 14 by means of a bracket 49. The gear 48 meshes with an idler gear 50 rotatably mounted on the direction disc which, in turn, meshes with a stationary gear 51 positioned beneath the disc 14 and, in this example, mounted on the autosyn receiver 12, see Figure 2. The gears 48 and 51 are exactly the same diameter and they have the same number of teeth. When the disc 14 is rotated, the rotor 44 moves about the disc centre, while the train of gears 48, 50 and 51 prevents the rotor itself from turning in relation to the aircraft. The weight of the gears is counterbalanced by a weight 52 carried by the disc 14 diametrically opposite said gears.

A radio line 54 extends through the centre (radio station) of the direction disc and the centre of the rotor 44 to indicate the "line of position" between the miniature aircraft 45 and the centre of the chart disc and the chart thereon.

As the chart disc 18 is compass-controlled it does not turn when the aircraft turns and, therefore, the heading of the aircraft may be read at the lubber line 29 on the scale 28. The direction disc 14 is rotated by the automatic direction finder of the aircraft. Therefore, when the aircraft is headed directly for the radio station indicated at 25, the longitudinal axis of the miniature aircraft 45 will coincide with the line of position 54. If the angle of the aircraft in relation to the line of position alters, this will be indicated by the miniature aircraft. The drift angle is indicated on the scales 44a or 44b on the rotor 44 when the aircraft is maintaining a track towards or away from the radio station.

When the disc 20 is secured to the chart disc 18, the miniature plane 45 indicates the quadrant in which the aircraft is positioned or the range leg on which the aircraft is flying. The pilot merely has to turn his aircraft until the line 54 coincides with the range leg 26 he desires to be on. If the aircraft is not headed directly for the station, the angle of drift will be noted on the scale 44a or 44b.

When the discs 20a or 20b are used, the pilot merely keeps his miniature aircraft on the lines 32 or 35 to reach the desired landing field or the desired landing strip.

Figures 5 and 6 illustrate a device by means of which the discs 14 and 18 may be rotated manually. An arm 80 is mounted at one end on a pivot 81, and carries a wheel 82 at its opposite end which is adapted to be moved into engagement with the periphery of the disc 14 or 18. The wheel 82 may be turned by means of a knob 83. The wheel 82 is held in or out of engagement with the adjacent disc by a spring 84 which is anchored at one end to the arm 80 and at its opposite end to a lever 85 which is mounted on the pivot 81 and extends outwardly therefrom on the opposite side of the arm 80. Spaced pins 86 and 87 limit the lateral movement of the lever 85.

Figures 9 and 10 illustrate a hand-operated device for indicating the bearing of the aircraft relative to a radio station, and the angle between the longitudinal axis of the aircraft and said bearing. This device includes a base 60 upon which a direction disc 61 is rotatably mounted. This disc corresponds to the disc 14 of the above-described device, and it includes a rotor 62 having an aircraft direction indicator 63 thereon. The direction indicator is kept pointing in the required direction by means of gears 64, 65 and 66, the latter being fixed to the base 60. A line of position 68 is provided. Azimuth scales 70 and 71 are provided on the base 60 around the disc 61, the first of these scales reading anticlockwise and the second one clockwise. The direction disc is provided with a pointer 73 which reads on the scale 71, while the disc 20 has a pointer 74 instead of the scale 28 described above. This pointer reads on the scale 70.

In order to use the device of Figures 9 and 10, the pointer 74 of the disc 20 is moved to the compass heading of the aircraft on the scale 70. At the same time, the pointer 73 is moved to the relative bearing of the aircraft on the scale 71. This relative bearing is ascertained from the direction finder or loop receiver of the aircraft. The indicator miniature aircraft 63 will now indicate the bearing of the aircraft with reference to the radio station and the angle between its longitudinal axis and said bearing on the chart of the disc 20.

The charts for both the automatic and the hand-operated devices are interchangeable so that a pilot may select the chart to suit the situation with which he is concerned. Thus, the pilot has an instrument which can give him correct indications relative to any given set of local conditions.

What I claim as my invention is:

1. An orientation device for aircraft and the like comprising a chart disc rotatably mounted at its centre which represents the position of a radio station, said chart disc being adapted to indicate the heading of the aircraft, a direction disc rotatably mounted at its centre beneath the chart disc the centres of both of said discs coinciding, said direction disc being adapted to indicate the relative bearing between the aircraft and the station, a line of position on the direction disc extending through its centre, an aircraft direction indicator rotatably mounted on the direction disc with its rotational axis on the line of position and spaced from the disc centre, and means for keeping the direction indicator pointed in the direction of the aircraft longitudinal axis regardless of the setting of the direction disc.

2. An aircraft orientation device comprising a rotatably mounted direction disc a line of position on the disc extending through its centre, an aircraft direction indicator rotatably mounted on the disc with its rotational axis on the line of position and spaced from the disc centre, and means for keeping the indicator pointing in the same direction during rotation of the direction disc, whereby the angle of the direction indicator changes in relation to the line of position during such rotation of the direction disc.

3. An aircraft orientation device comprising a rotatably mounted direction disc, an aircraft direction indicator rotatably mounted on the disc, means for keeping the indicator pointing in a predetermined direction when the direction disc is rotated, and a transparent disc having a chart thereon rotatably mounted above the direction disc, said chart disc being adapted to be set to any compass bearing.

4. An aircraft orientation device comprising a rotatably mounted direction disc adapted to be set at any bearing relative to a radio signal station, an aircraft direction indicator rotatably mounted on the disc, means for keeping the indicator pointing in a predetermined direction when the direction disc is rotated, and a transparent disc having a chart thereon rotatably mounted above the direction disc, said chart disc being adapted to be set to any compass bearing to indicate the position and angle of the indicator in relation to the station.

5. An aircraft orientation device comprising a rotatably mounted direction disc adapted to be controlled by the radio direction finder of an aircraft, an aircraft direction indicator rotatably mounted on the disc, and means for keeping the indicator pointing in a predetermined direction when the direction disc is rotated by the direction finder.

6. An aircraft orientation device comprising a rotatably mounted direction disc adapted to be controlled by the radio direction finder of an aircraft, and aircraft direction indicator rotatably mounted on the disc, means for keeping the indicator pointing in a predetermined direction when the direction disc is rotated by the direction finder, a transparent disc having a chart thereon rotatably mounted above the direction disc, and means connecting the chart disc to a compass whereby said disc is controlled by the latter.

7. An aircraft orientation device comprising a rotatably mounted direction disc, an aircraft direction indicator rotatably mounted on the disc, a gear connected to the indicator, a stationary gear of the same size and number of teeth as the indicator gear, and an idler gear meshing with the indicator and stationary gears, whereby the indicator remains pointing in a predetermined direction when the disc is rotated.

8. An aircraft orientation device comprising a rotatably mounted direction disc, means controlled by the radio direction finder of an aircraft for rotating the disc, an aircraft direction indicator rotatably mounted on the disc, a gear connected to the indicator, a stationary gear of the same size and number of teeth as the indicator gear, and an idler gear meshing with the indicator and stationary gears, whereby the indicator remains pointing in a predetermined direction when the disc is rotated by the direction finder.

9. An aircraft orientation device comprising a rotatably mounted direction disc, means controlled by the radio direction finder of an aircraft for rotating the disc, an aircraft direction indicator rotatably mounted on the disc, a gear connected to the indicator, a stationary gear of the same size and number of teeth as the indicator gear, an idler gear meshing with the indicator stationary gears, and a transparent disc having a chart thereon rotatably mounted above the direction disc, and means connecting the chart to a compass whereby said chart is controlled by the latter.

10. An orientation device for aircraft and the like comprising a chart disc rotatably mounted at its centre which represents the position of a radio station, said chart disc being adapted to be moved to indicate the heading of the aircraft, a direction disc rotatably mounted at its centre beneath the chart disc, the centres of both of said discs coinciding, said direction disc being adapted to be moved to indicate the relative bearing between the aircraft and the station, a line of position on the direction disc extending through its centre, an aircraft direction indicator rotatably mounted on the direction disc, with its rotational axis on the line of position and spaced from the disc centre, and means for keeping the direction indicator pointing in the same direction during rotation of the direction disc, whereby the angle of the direction indicator changes in relation to the line of position during such rotation of the direction disc.

11. An aircraft orientation device comprising a rotatably mounted direction disc, means controlled by the radio direction finder of an aircraft for rotating the disc, a line of position on the direction disc extending through its centre, an aircraft direction indicator rotatably mounted on the disc with its rotational axis on the line of position and spaced from the disc centre, a gear connected to the indicator, a stationary gear of the same size and number of teeth as the indicator gear, an idler gear meshing with the indicator and stationary gears, a transparent disc having a chart thereon rotatably mounted above the direction disc, the centre of said chart coinciding with the centre of the direction disc, and means connecting the chart to a compass whereby said chart is controlled by the latter.

12. An aircraft orientation device comprising a base, a chart disc rotatably mounted at its centre which represents the position of a radio station, an azimuth scale on the base around the disc, a pointer on the disc reading on said scale, a direction disc rotatably mounted at its centre beneath the chart disc, the centres of both of said discs coinciding, a second azimuth scale on the base around the direction disc, a pointer on the direction disc reading on the second scale, an aircraft direction indicator rotatably mounted on the direction disc, and means for keeping the indicator pointing in the same direction during rotation of the direction disc.

13. An aircraft orientation device comprising a base, a chart disc rotatably mounted at its centre which represents the position of a radio station, an azimuth scale on the base around the disc, a pointer on the disc reading on said scale, a direction disc rotatably mounted at its centre beneath the chart disc, the centres of both of said discs coinciding, a second azimuth scale on the base around the direction disc, a pointer on the direction disc reading on the second scale, a line of position on the direction disc extending through its centre, an aircraft direction indicator rotatably mounted on the direction disc, with its rotational axis on the line of position and spaced from the disc centre, and means for keeping the direction indicator pointing in the same direction during rotation of the direction disc, whereby the angle of the direction indicator changes in relation to the line of position during such rotation of the direction disc.

WALTER JOHN TWAMLEY.

REFERENCES CITED

The following references are of record in the file of this patent:

UNITED STATES PATENTS

| Number | Name | Date |
|---|---|---|
| 2,069,285 | Stark | Feb. 2, 1937 |
| 2,178,623 | Carter | Nov. 7, 1939 |
| 2,262,245 | Moseby et al. | Nov. 11, 1941 |
| 2,424,570 | Jenks | July 29, 1947 |
| 2,425,762 | Stone | Aug. 19, 1947 |
| 2,502,721 | Halpert | Apr. 4, 1950 |